United States Patent
Wen (12)

(10) Patent No.: US 6,761,251 B1
(45) Date of Patent: Jul. 13, 2004

(54) HYDRAULIC BRAKE DEVICE FOR A BICYCLE

(76) Inventor: Chun Te Wen, No. 1, Alley 16, Lane 40, Jinn Te Rd., Taichung (TW)

( * ) Notice: Subject to any disclaimer, the term of this patent is extended or adjusted under 35 U.S.C. 154(b) by 0 days.

(21) Appl. No.: 10/444,726

(22) Filed: May 22, 2003

(51) Int. Cl.[7] .................................................. B62L 5/00
(52) U.S. Cl. .......................... 188/26; 188/344; 188/72.2
(58) Field of Search .......................... 188/26, 72.4, 344, 188/72.2, 72.5, 72.6, 18 A

(56) References Cited

U.S. PATENT DOCUMENTS 5,024,298 A * 6/1991 Schenk et al. .............. 188/72.2
5,358,078 A * 10/1994 Gajek et al. ................ 188/72.4
5,632,362 A * 5/1997 Leitner ........................ 188/344
6,510,926 B1 * 1/2003 Nakamura ..................... 188/26

* cited by examiner

Primary Examiner—Robert A. Siconolfi
Assistant Examiner—Melanie Torres

(57) ABSTRACT

A hydraulic brake device for a bicycle includes a hydraulic brake having a first recess and a second recess, and a conduit wire connected to the triple body of the hydraulic brake. The triple body has an inside provided with an inlet tube connected to the conduit wire, a first tube connected to the inlet tube and the first channel of the first recess, and a second tube connected to the inlet tube and the second channel of the second recess. Thus, the hydraulic brake device can provide a braking effect gradually, without incurring a self-locking action, thereby protecting the rider's safety.

6 Claims, 8 Drawing Sheets

HYDRAULIC BRAKE DEVICE FOR A BICYCLE

BACKGROUND OF THE INVENTION

1. Field of the Invention

The present invention relates to a hydraulic brake device for a bicycle, and more particularly to a hydraulic brake device for a bicycle, wherein the hydraulic brake device can provide a braking effect gradually, without incurring a self-locking action, thereby protecting the rider's safety.

2. Description of the Related Art

A conventional hydraulic brake device for a bicycle has the following disadvantages.

1. The conventional hydraulic brake device is easily self-locked under the emergency condition, thereby causing danger to the rider.

2. The conventional hydraulic brake device is not sensitive, so that it cannot be operated conveniently.

SUMMARY OF THE INVENTION

The present invention is to mitigate and/or obviate the disadvantage of the conventional hydraulic brake device for a bicycle.

The primary objective of the present invention is to provide a hydraulic brake device for a bicycle, wherein the hydraulic brake device can provide a braking effect gradually, without incurring a self-locking action, thereby protecting the rider's safety.

Another objective of the present invention is to provide a hydraulic brake device for a bicycle, wherein the hydraulic brake device can provide a braking effect gradually so that the rider has a buffer time to handle the emergency condition.

A further objective of the present invention is to provide a hydraulic brake device for a bicycle, wherein the hydraulic brake device can provide a braking effect gradually, so that the hydraulic brake device is sensitive and can be operated smoothly and conveniently.

In accordance with the present invention, there is provided a hydraulic brake device for a bicycle, comprising a hydraulic brake, and a conduit wire connected to the hydraulic brake, wherein:

the hydraulic brake has a top provided with a triple body connected to the conduit wire;

the hydraulic brake has an inside formed with a first recess and a second recess, the first recess is formed with a first channel connected to the triple body, the second recess is formed with a second channel connected to the triple body;

the triple body has an inside provided with an inlet tube connected to the conduit wire, a first tube connected to the inlet tube and the first channel of the first recess, and a second tube connected to the inlet tube and the second channel of the second recess;

the first tube is provided with a first compression spring; and the second tube is provided with a second compression spring, and a locking ball urged on the second compression spring to control a flow direction of a hydraulic oil.

Further benefits and advantages of the present invention will become apparent after a careful reading of the detailed description with appropriate reference to the accompanying drawings.

DETAILED DESCRIPTION OF THE INVENTION

Figure 1:
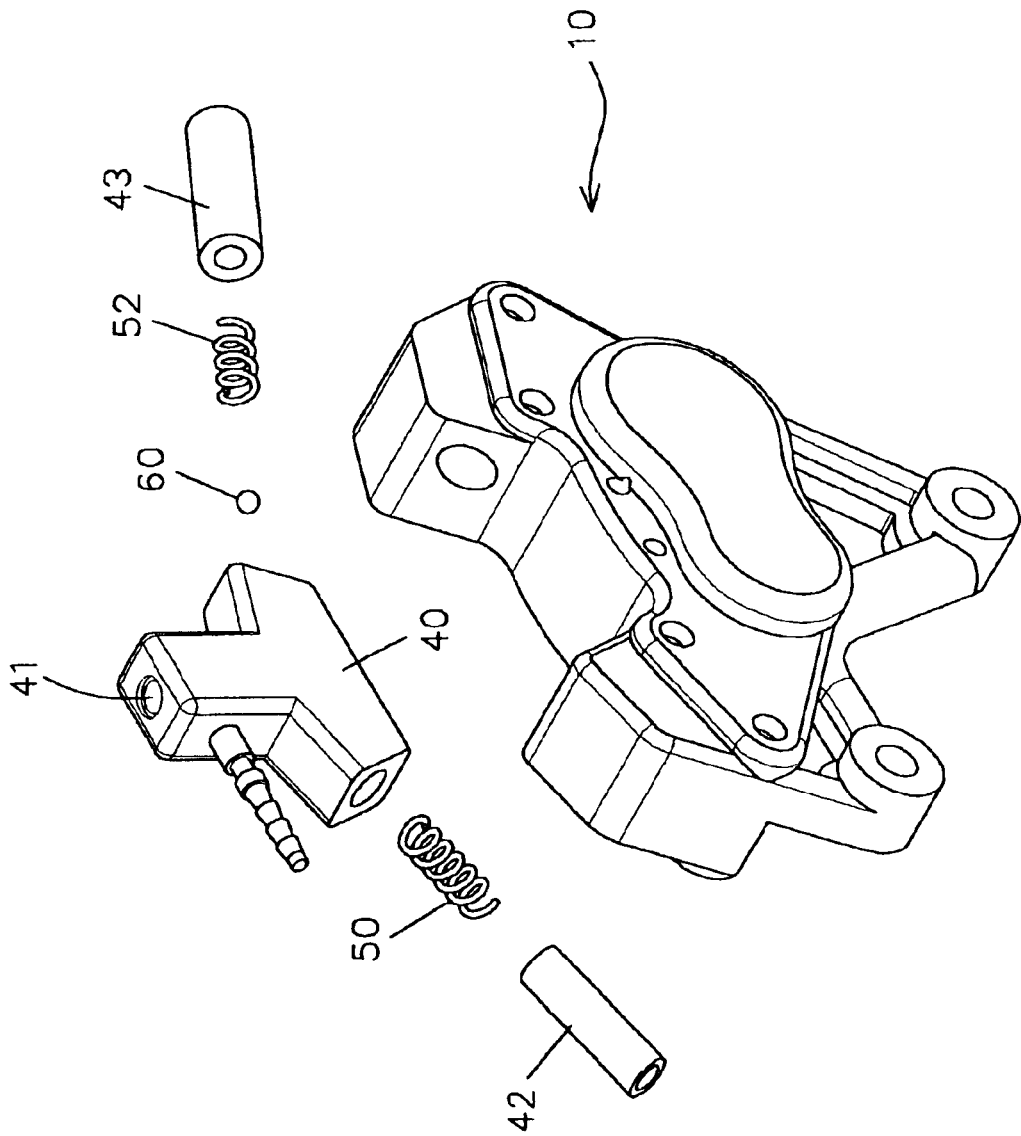
FIG. 1 is an exploded perspective view of a hydraulic brake device for a bicycle in accordance with the preferred embodiment of the present invention.
Figure 2:
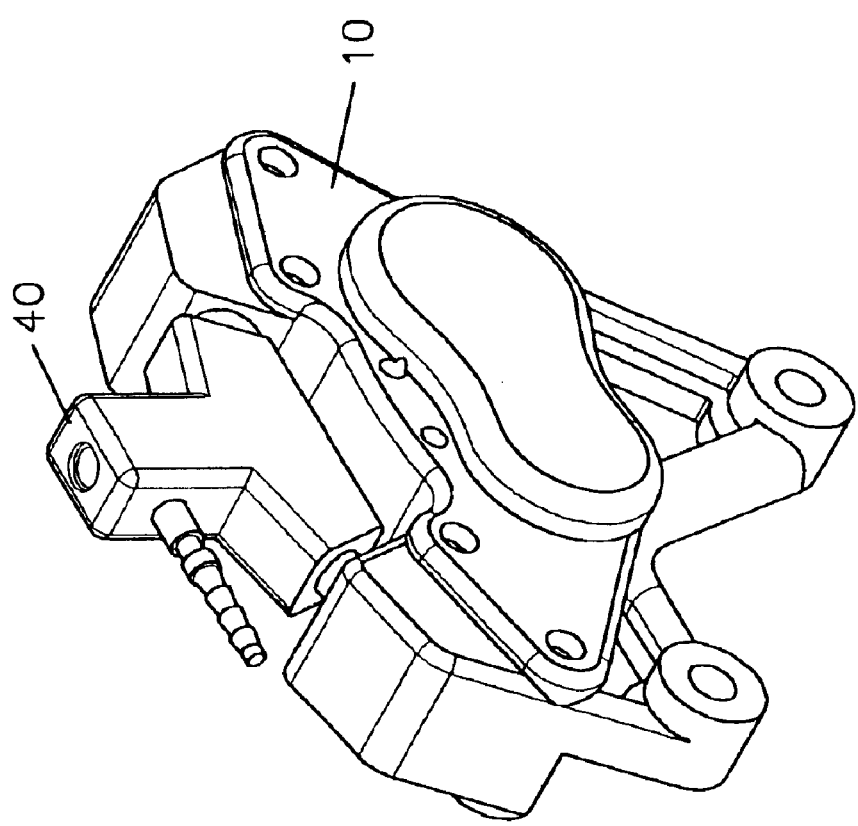
FIG. 2 is a perspective assembly view of the hydraulic brake device for a bicycle in accordance with the preferred embodiment of the present invention.
Figure 3:
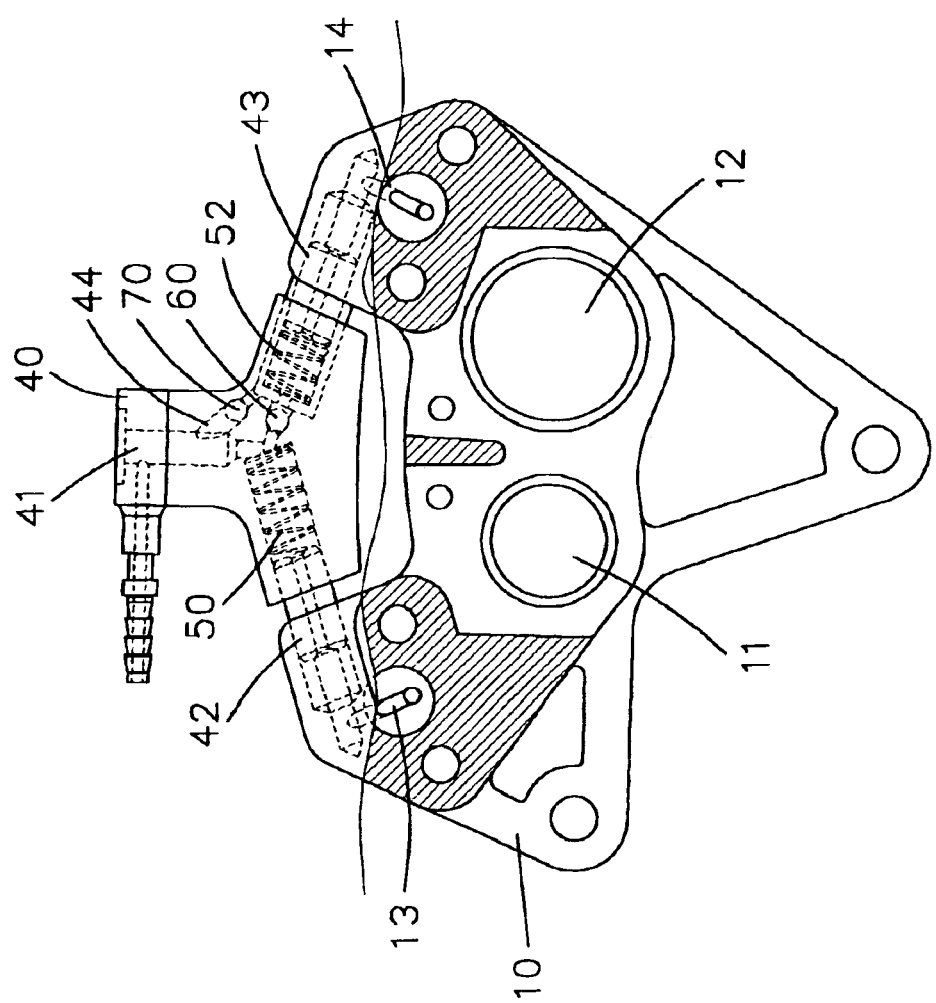
FIG. 3 is a front plan cross-sectional view of the hydraulic brake device for a bicycle as shown in FIG. 2.

Referring to the drawings and initially to FIGS. 1–3, a hydraulic brake device for a bicycle in accordance with the preferred embodiment of the present invention comprises a hydraulic brake 10, a brake disk 20 (see FIG. 7) driven by the hydraulic brake 10, and a conduit wire 30 (see FIG. 7) connected to the hydraulic brake 10 for supplying the hydraulic oil to the hydraulic brake 10.

The hydraulic brake 10 is an irregular body. The hydraulic brake 10 has a top provided with a triple body 40 connected to the conduit wire 30. The hydraulic brake 10 has an inside formed with a first circular recess 11 and a second circular recess 12. The first circular recess 11 has a diameter different from that of the second circular recess 12. The first circular recess 11 is formed with a first channel 13 connected to the triple body 40. The second circular recess 12 is formed with a second channel 14 connected to the triple body 40.

The triple body 40 has an inside provided with an inlet tube 41 connected to the conduit wire 30, a first tube 42 connected to the inlet tube 41 and the first channel 13 of the first circular recess 11, and a second tube 43 connected to the inlet tube 41 and the second channel 14 of the second circular recess 12. The first tube 42 is provided with a first compression spring 50. The second tube 43 is provided with a second compression spring 52, and a locking ball 60 urged on the second compression spring 52 to control the flow direction of the hydraulic oil.

The inside of the triple body 40 is provided with a passage 44 connected between the inlet tube 41 and the second tube 43, and a stop ball 70 mounted in the passage 44 to control the flow direction of the hydraulic oil.

In operation, referring to FIGS. 1–8, when the brake lever (not shown) of the bicycle is pressed by the rider, the hydraulic oil is supplied through the conduit wire 30 (see FIG. 7) to the hydraulic brake 10.

Figure 4:
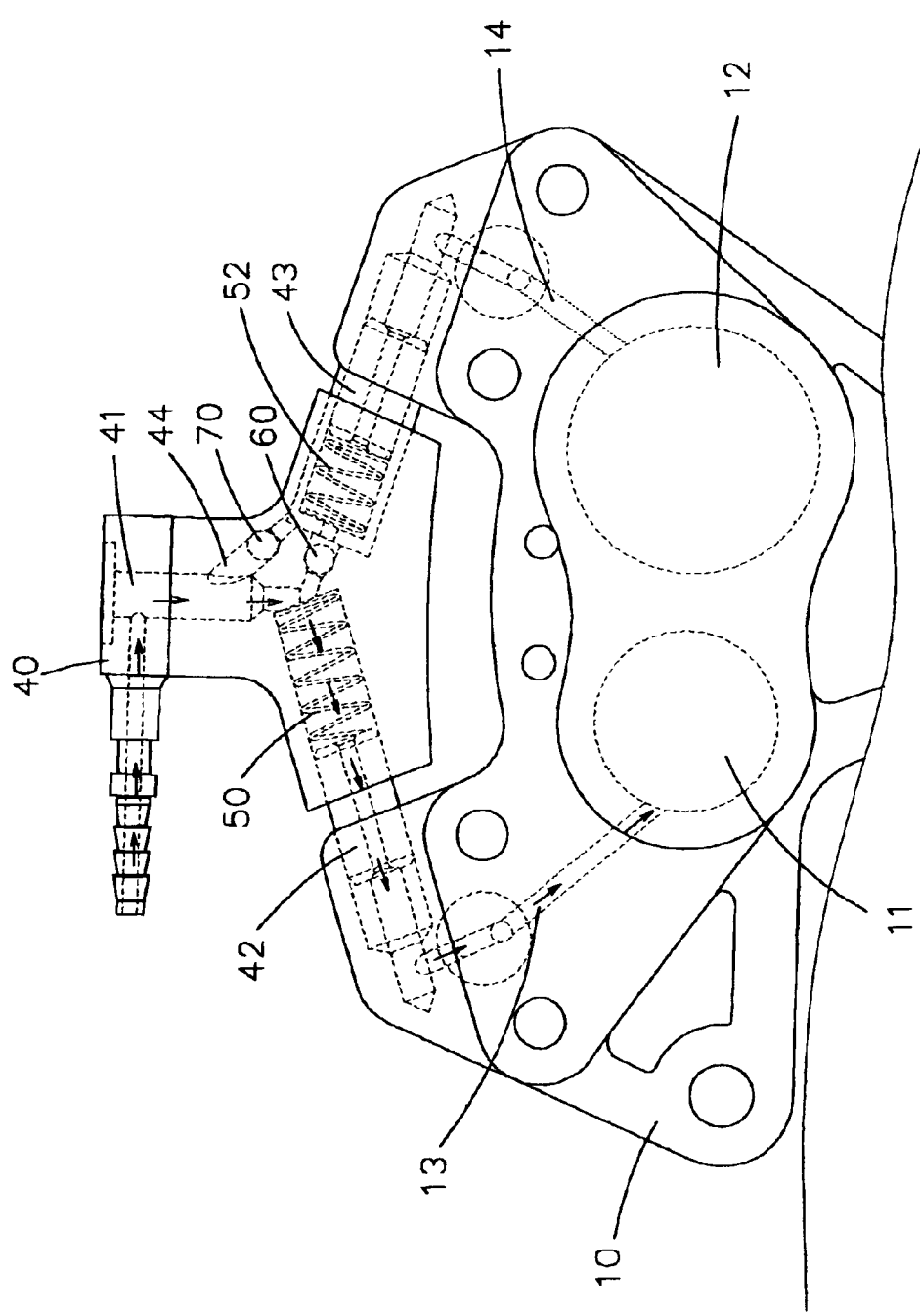
FIG. 4 is a schematic operational view of the hydraulic brake device for a bicycle as shown in FIG. 3 in use.
Figure 7:
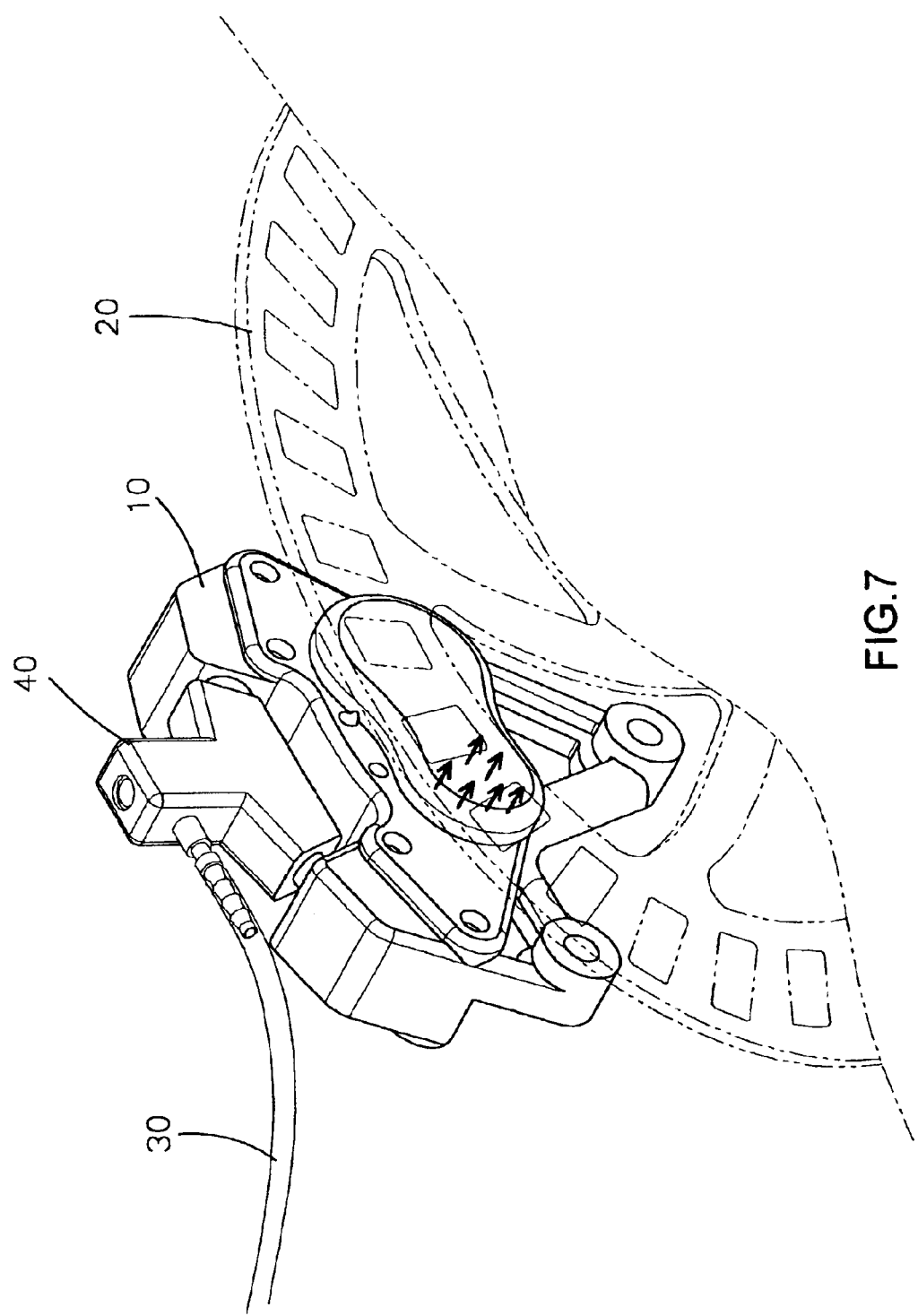
FIG. 7 is a schematic operational view of the hydraulic brake device for a bicycle as shown in FIG. 2 in use.

As shown in FIGS. 4 and 7, the hydraulic oil in turn flows through the triple body 40, the inlet tube 41, the first tube 42 and the first channel 13, and flows into the first circular recess 11 as indicated by the arrows. At this time, the hydraulic oil flowing into the first circular recess 11 will drive the brake pad (not shown) in the first circular recess 11 to perform a braking action as shown in FIG. 7.

Figure 5:
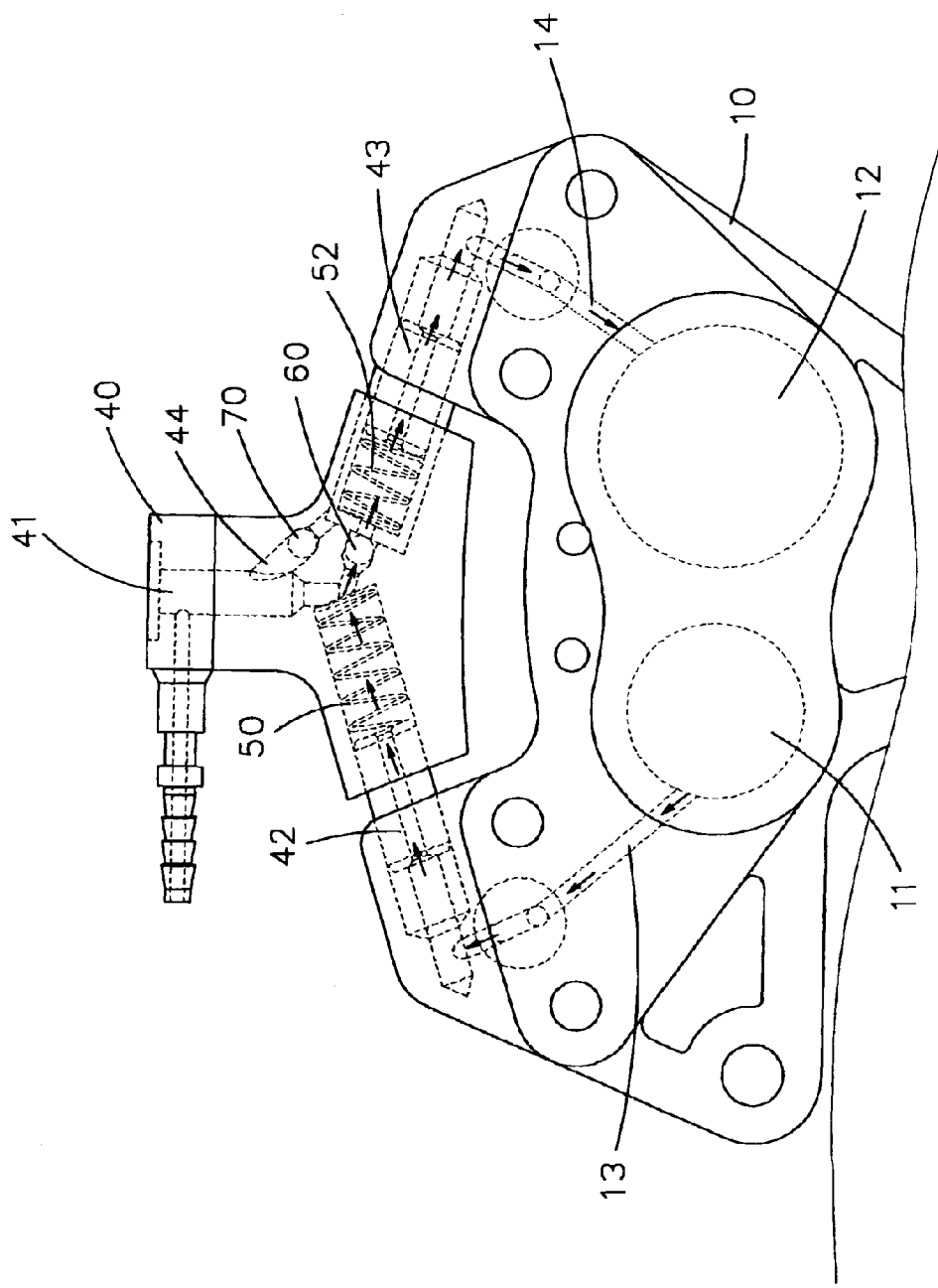
FIG. 5 is a schematic operational view of the hydraulic brake device for a bicycle as shown in FIG. 4 in use.
Figure 8:
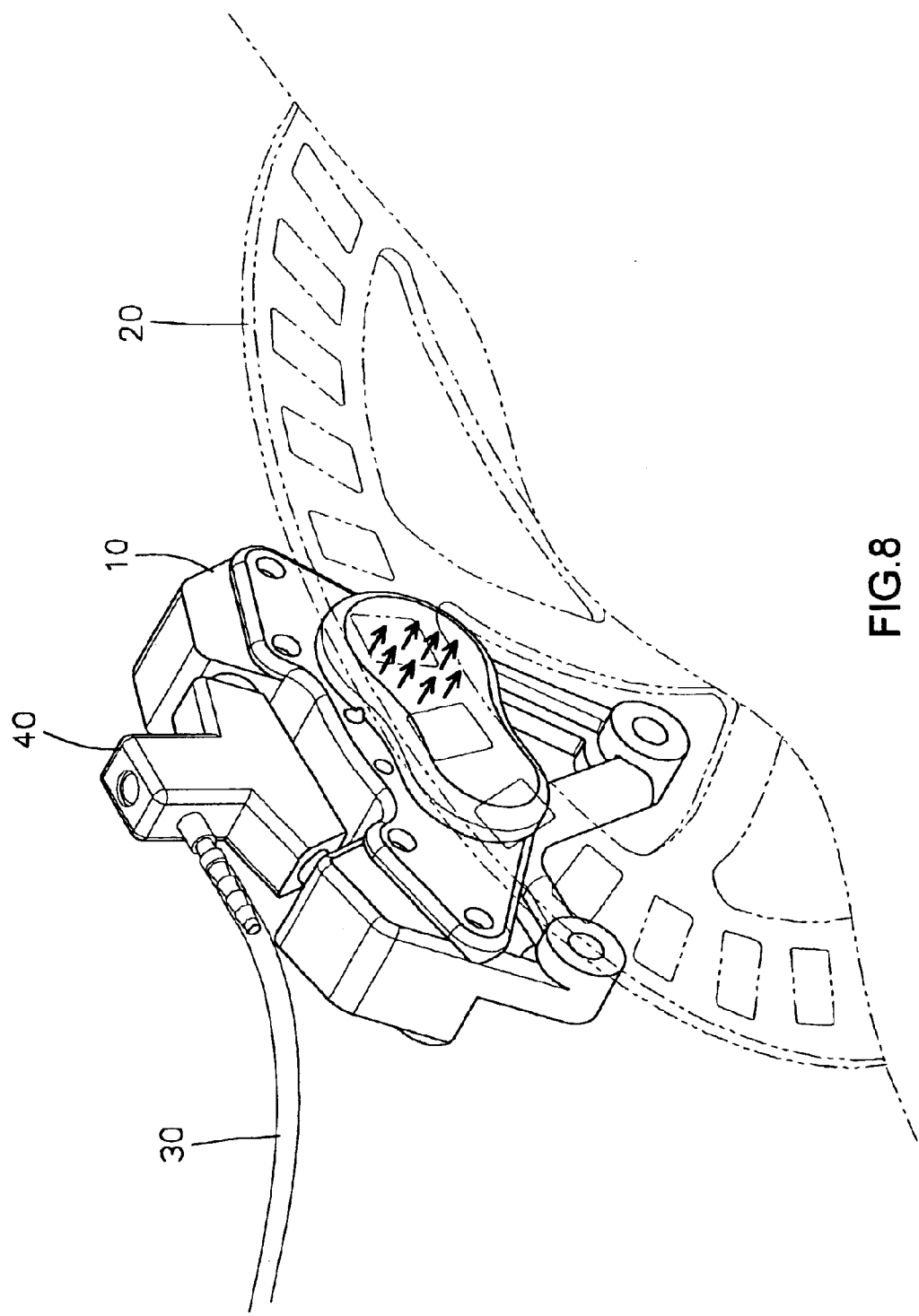
FIG. 8 is a schematic operational view of the hydraulic brake device for a bicycle as shown in FIG. 2 in use.

Then, when the brake lever of the bicycle is slightly released, the hydraulic oil will flow back from the first circular recess 11 to pass through the first channel 13 and the first tube 42, to push away the locking ball 60, to flow through the second tube 43 and the second channel 14, and flows into the second circular recess 12 as indicated by the arrows in FIG. 5. At this time, the hydraulic oil flowing into the second circular recess 12 will drive the brake pad (not shown) in the second circular recess 12 to perform a braking action as shown in FIG. 8, thereby braking the bicycle.

Figure 6:
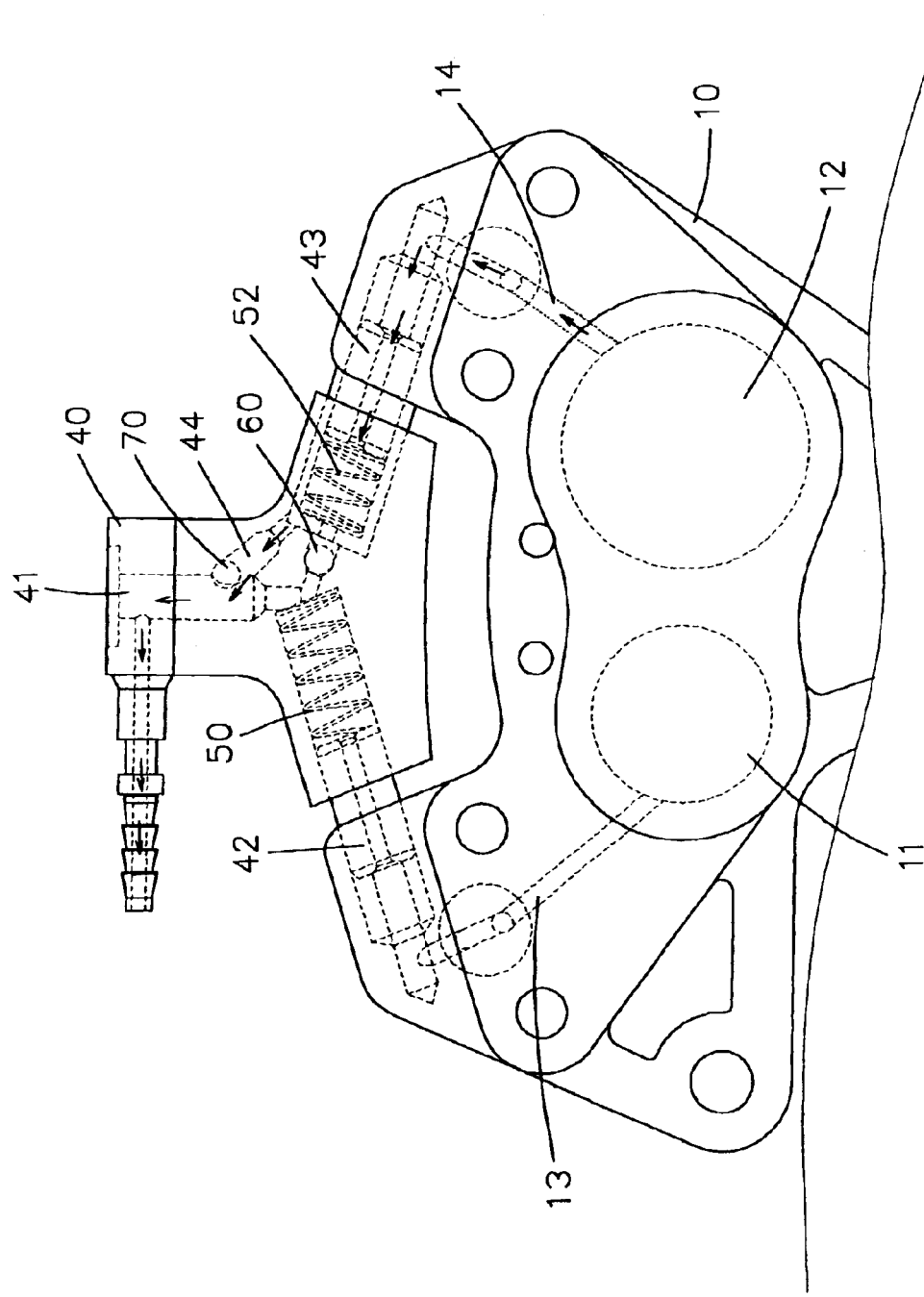
FIG. 6 is a schematic operational view of the hydraulic brake device for a bicycle as shown in FIG. 5 in use.

When the brake lever of the bicycle is released completely, the hydraulic oil will flow back from the second circular recess 12 to pass through the second channel 14, the second tube 43 and the passage 44, push away the stop ball 70 in the passage 44, flow through the inlet tube 41, and finally flow back into the conduit wire 30 as indicated by the arrows in FIG. 6.

Accordingly, the hydraulic brake device can provide a braking effect gradually, without incurring a self-locking action, thereby protecting the rider's safety. In addition, the hydraulic brake device can provide a braking effect gradually so that the rider has a buffer time to handle the emergency condition. Further, the hydraulic brake device can provide a braking effect gradually, so that the hydraulic brake device is sensitive and can be operated smoothly and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hydraulic brake device for a bicycle, comprising a hydraulic brake, and a conduit wire connected to the hydraulic brake, wherein:

the hydraulic brake has a top provided with a triple body connected to the conduit wire;

the hydraulic brake has an inside formed with a first recess and a second recess, the first recess is formed with a first channel connected to the triple body, the second recess is formed with a second channel connected to the triple body;

the triple body has an inside provided with an inlet tube connected to the conduit wire, a first tube connected to the inlet tube and the first channel of the first recess, and a second tube connected to the inlet tube and the second channel of the second recess;

the first tube is provided with a first compression spring; and the second tube is provided with a second compression spring, and a locking ball urged on the second compression spring to control a flow direction of a hydraulic oil.

2. The hydraulic brake device for a bicycle in accordance with claim 1, wherein the hydraulic brake is an irregular body.

3. The hydraulic brake device for a bicycle in accordance with claim 1, wherein the first circular recess has a diameter different from that of the second circular recess.

4. The hydraulic brake device for a bicycle in accordance with claim 1, wherein the first recess has a circular shape.

5. The hydraulic brake device for a bicycle in accordance with claim 1, wherein the second recess has a circular shape.

6. The hydraulic brake device for a bicycle in accordance with claim 1, wherein the inside of the triple body is provided with a passage connected between the inlet tube and the second tube, and a stop ball mounted in the passage to control the flow direction of the hydraulic oil.

* * * * *